(12) United States Patent
Fujiwara et al.

(10) Patent No.: US 11,410,329 B2
(45) Date of Patent: Aug. 9, 2022

(54) INFORMATION PROCESSING DEVICE, METHOD PERFORMED THEREBY, AND NON-TRANSITORY COMPUTER READABLE MEDIUM

(71) Applicant: TOSHIBA TEC KABUSHIKI KAISHA, Tokyo (JP)

(72) Inventors: Akihiko Fujiwara, Ikoma Nara (JP); Mika Hirama, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 57 days.

(21) Appl. No.: 16/911,350

(22) Filed: Jun. 24, 2020

(65) Prior Publication Data

US 2021/0090286 A1     Mar. 25, 2021

(30) Foreign Application Priority Data

Sep. 24, 2019  (JP) .............................. JP2019-173266

(51) Int. Cl.
*G06T 7/73*     (2017.01)

(52) U.S. Cl.
CPC ...... *G06T 7/73* (2017.01); *G06T 2207/30204* (2013.01)

(58) Field of Classification Search
CPC ............. G06T 2207/30204; G06T 7/73; G06T 2207/10016; G06T 2207/30244; G06T 7/80
See application file for complete search history.

(56) References Cited

U.S. PATENT DOCUMENTS

| | | | | |
|---|---|---|---|---|
| 6,556,722 | B1 * | 4/2003 | Russell | G01S 5/163 348/E5.022 |
| 9,524,436 | B2 * | 12/2016 | Salter | G06K 9/00671 |
| 10,032,288 | B2 * | 7/2018 | Lee | G06T 7/70 |
| 2007/0242886 | A1 * | 10/2007 | St John | G06K 9/3216 382/201 |
| 2008/0285854 | A1 * | 11/2008 | Kotake | G06T 7/73 382/190 |
| 2016/0239952 | A1 * | 8/2016 | Tanaka | G06T 7/70 |

(Continued)

FOREIGN PATENT DOCUMENTS

| | | | |
|---|---|---|---|
| JP | 2006-234453 A | | 9/2006 |
| KR | 2010086128 A | * | 7/2010 |
| WO | WO-2019205868 A1 | * | 10/2019 ............. G06T 7/248 |

OTHER PUBLICATIONS

Extended European Search Report dated Jan. 13, 2021, in corresponding European Patent Application No. 20190149.3, 9 pages.

(Continued)

*Primary Examiner* — Ian L Lemieux
(74) *Attorney, Agent, or Firm* — Kim & Stewart LLP

(57) ABSTRACT

An information processing device includes a memory that stores a known position of a marker, a camera, and a processor. The processor is configured to determine whether the image includes the marker, calculate a relative position of the marker with respect to the camera and store the calculated relative position in the memory if image includes the marker, and determine a position of the camera using the known position of the marker and two or more relative positions calculated for the marker stored in the memory.

18 Claims, 2 Drawing Sheets

(56) References Cited

U.S. PATENT DOCUMENTS

| | | | |
|---|---|---|---|
| 2017/0132806 A1* | 5/2017 | Balachandreswaran | G06K 9/623 |
| 2017/0249745 A1* | 8/2017 | Fiala | A63F 13/213 |
| 2018/0018791 A1* | 1/2018 | Guoyi | G02B 27/0176 |
| 2018/0293801 A1* | 10/2018 | Metzler | G06K 7/1456 |
| 2019/0156577 A1* | 5/2019 | Barros | G06K 9/18 |
| 2020/0090365 A1* | 3/2020 | Hu | G06F 3/012 |
| 2020/0342625 A1* | 10/2020 | Lerman | G06K 9/00671 |
| 2020/0349378 A1* | 11/2020 | Raghoebardajal | G06K 9/00671 |

OTHER PUBLICATIONS

Monica Rubio et al: "Jittering Reduction in Marker-Based Augmented Reality Systems" Jan. 1, 2006, Computational Science and Its Applications—ICCSA 2006 : International Conference, Glasgow, UK, May 8-11, 2006; Proceedings , Part 1; [Lecture Notes in Computer Science , ISSN 0302-9743], Springer, Berlin, DE, pp. 510-517, XP019031794,ISBN: 978-3-540-34070-6.

Navid Kayhani et al: "Improved Tag-based Indoor Localization of UAVs Using Extended Kalman Filter", 35th International Symposium on Automation and Robotics in Construction (ISARC 2018), May 24, 2019, XP055760085, ISSN: 2413-5844, DOI: 10.22260/ISARC2019/0083.

Yang Xin et al: "Robust and real-time pose tracking for augmented reality on mobile devices", Multimedia Tools and Applications, Kluwer Academic Publishers, Boston, US, vol. 77, No. 6, Mar. 21, 2017 pp. 6607-6628, XP036461918, ISSN: 1380-7501, DOI: 10.1007/S11042-017-4575-3.

\* cited by examiner

INFORMATION PROCESSING DEVICE, METHOD PERFORMED THEREBY, AND NON-TRANSITORY COMPUTER READABLE MEDIUM

CROSS-REFERENCE TO RELATED APPLICATION

This application is based upon and claims the benefit of priority from Japanese Patent Application No. 2019-173266, filed Sep. 24, 2019, the entire contents of which are incorporated herein by reference.

FIELD

Embodiments described herein relate generally to an information processing device, a method performed thereby, and a non-transitory computer readable medium.

BACKGROUND

Augmented reality (AR) can present various kinds of information by superimposing and displaying virtual objects on a real world image. The augmented reality can present various kinds of information for supporting shoppers in stores and workers at job sites.

In order to track the position of a terminal device associated with the AR display, there is a method of measuring the position and orientation (also referred to as a posture) of the terminal device using an AR marker (hereinafter more simply referred to as "marker"). For such tracking using a marker, relative positions of a camera and the marker need to be accurately calculated. However, accuracy in calculating these relative positions may be deteriorated depending on various circumstances. For example, the accuracy is deteriorated in the following situations: (a) the terminal device is rotated and a relative angle of the terminal device with respect to the marker becomes large, (b) an area occupied by the marker within an image photographed by the camera becomes small because the terminal device has moved away from the marker, (c) an obstacle is between the camera and the marker, or (d) illumination on the marker is not proper. In a state in which the accuracy is deteriorated in this way, the position of the terminal device cannot be accurately measured or otherwise determined.

DETAILED DESCRIPTION

Figure 1:
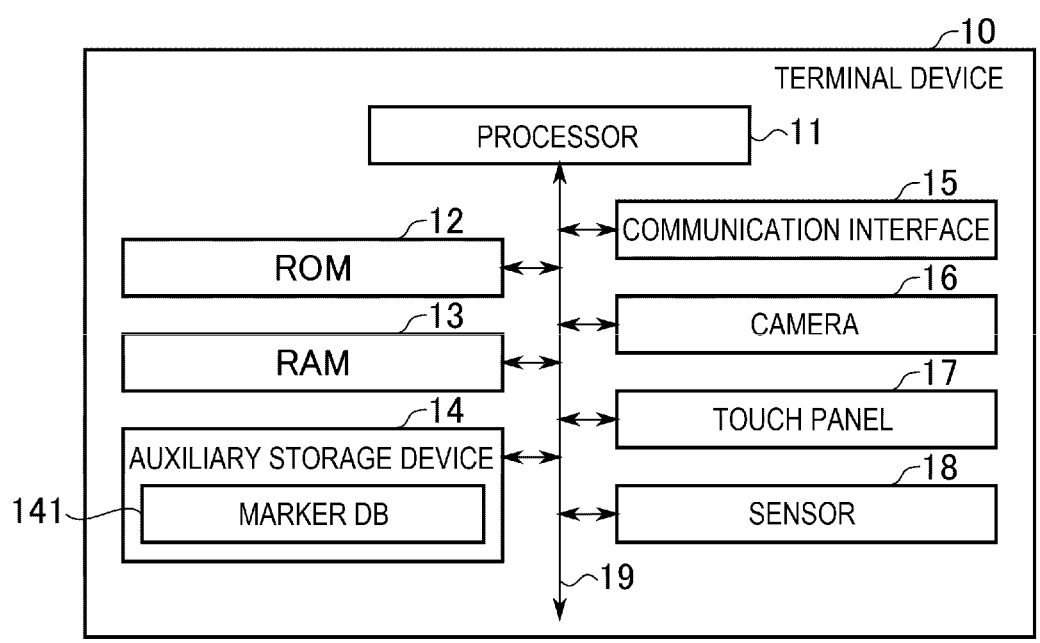
FIG. 1 is a hardware block diagram of a terminal device according to an embodiment.

One or more embodiments provide an information processing device that provides high accuracy in determining a position and a posture even in conditions that would otherwise be expected cause a deterioration in measurement accuracy.

In general, according to an embodiment, an information processing device includes a memory to store a known position of a marker; a camera configured to acquire an image; and a processor. The processor is configured to determine whether the image includes the marker, calculate a relative position of the marker with respect to the camera and store the calculated relative position in the memory if the image includes the marker, and then determine a position of the camera using the known position of the marker and two or more relative positions calculated for the marker and stored in the memory.

A terminal device according to an embodiment is explained below with reference to the drawings. In the drawings, the same components are represented by the same reference numerals.

FIG. 1 is a hardware block diagram of a terminal device 10 according to an embodiment.

The terminal device 10 superimposes and displays, on a real time basis, a virtual object over live video image being captured by a camera. Therefore, the terminal device 10 is a display device for augmented reality. The terminal device 10 is, for example, a tablet terminal, a smartphone, or an HMD (head-mounted display). For example, the terminal device 10 is a tablet terminal attached to a wheeled, movable body, such as a shopping cart or another type of cart. The terminal device 10 includes, for example, a processor 11, a ROM (read-only memory) 12, a RAM (random-access memory) 13, an auxiliary storage device 14, a communication interface 15, a camera 16, a touch panel 17, and a sensor 18. A bus 19 or the like connects these units.

The processor 11 performs arithmetic operations necessary for the operation of the terminal device 10. The processor 11 controls the components of the terminal device 10 in order to provide the various functions of the terminal device 10 according to programs such as firmware, system software, and/or application software stored in the ROM 12, the auxiliary storage device 14, or the like. The processor 11 executes processing explained below according to these programs. In some examples, a part or all of the functions or processing described below as being implemented by execution of such programs may instead be provided by a dedicated hardware circuit or circuits. The processor 11 is, for example, a CPU (central processing unit), an MPU (micro processing unit), an SoC (system on a chip), a DSP (digital signal processor), a GPU (graphics processing unit), an ASIC (application specific integrated circuit), a PLD (programmable logic device), or an FPGA (field-programmable gate array). Alternatively, the processor 11 is a combination of the components described above.

The ROM 12 is a read-only nonvolatile memory. The ROM stores, for example, firmware among the programs described above. The ROM 12 also stores data and the like used by the processor 11 in performing various kinds of processing.

The RAM 13 is a rewritable memory and is used as a work area for temporarily storing data used by the processor 11 in performing various kinds of processing. The RAM 13 is typically a volatile memory.

The auxiliary storage device 14 is a storage device, such as, an EEPROM (electric erasable programmable read-only memory), an HDD (hard disk drive), or a flash memory. The auxiliary storage device 14 stores, for example, the system software, the application software, and the like among the programs described above. The auxiliary storage device 14 stores data used by the processor 11 in performing various kinds of processing, data generated by the processing in the processor 11, various setting values, and the like.

The auxiliary storage device 14 stores a marker database (DB) 141. Markers are registered in the marker DB 141. The marker DB 141 stores marker IDs (identifiers), feature data, positions and postures or orientations in a global coordinate system, and the like for the registered markers. The marker IDs are identification information for uniquely identifying each of the markers.

The communication interface 15 is an interface for the terminal device 10 to communicate with other devices via a network NW or the like.

The camera 16 provides an image or images. The camera 16 outputs data of the acquired image. Additionally, the camera 16 can capture and output a video feed/stream.

The touch panel 17 is a display such as a liquid crystal display or an organic EL (electro-luminescence) display into which a pointing device that detects touch input is integrated. The display included in the touch panel 17 displays a screen for notifying various kinds of information to an operator of the terminal device 10. The touch panel 17 functions as an input device that receives touch operation by the operator.

In the terminal device 10, the camera 16 is typically provided to face the opposite side of the display surface of the touch panel 17. In other words, the optical axis direction of light incident on the camera 16 and the normal direction of the touch panel 17 are the same direction.

The sensor 18 is used for estimation of a position and a posture of the terminal device 10. The sensor 18 may incorporate or be multiple sensors of the same or different types. The sensor 18 outputs a measurement value. The sensor 18 is, for example, an acceleration meter (accelerometer), a gyro scope, an odometer, a magnetometer such as an electronic compass, a GNSS (global navigation satellite system) sensor such as a GPS (global positioning system) sensor, a depth sensor, or a position tracker of an electromagnetic type, an optical type, a mechanical type, or an ultrasonic type. The terminal device 10 may include, as the sensor 18, two or more of the sensors described above. In some examples, the sensor 18 may be attached to a wheeled movable body such as a shopping cart.

The sensor 18 may be connected to other devices arranged outside the terminal device 10 by wire or wirelessly.

The bus 19 is, for example, a control bus, an address bus, a data bus, or the like and conveys signals exchanged by the units of the terminal device 10.

Figure 2:
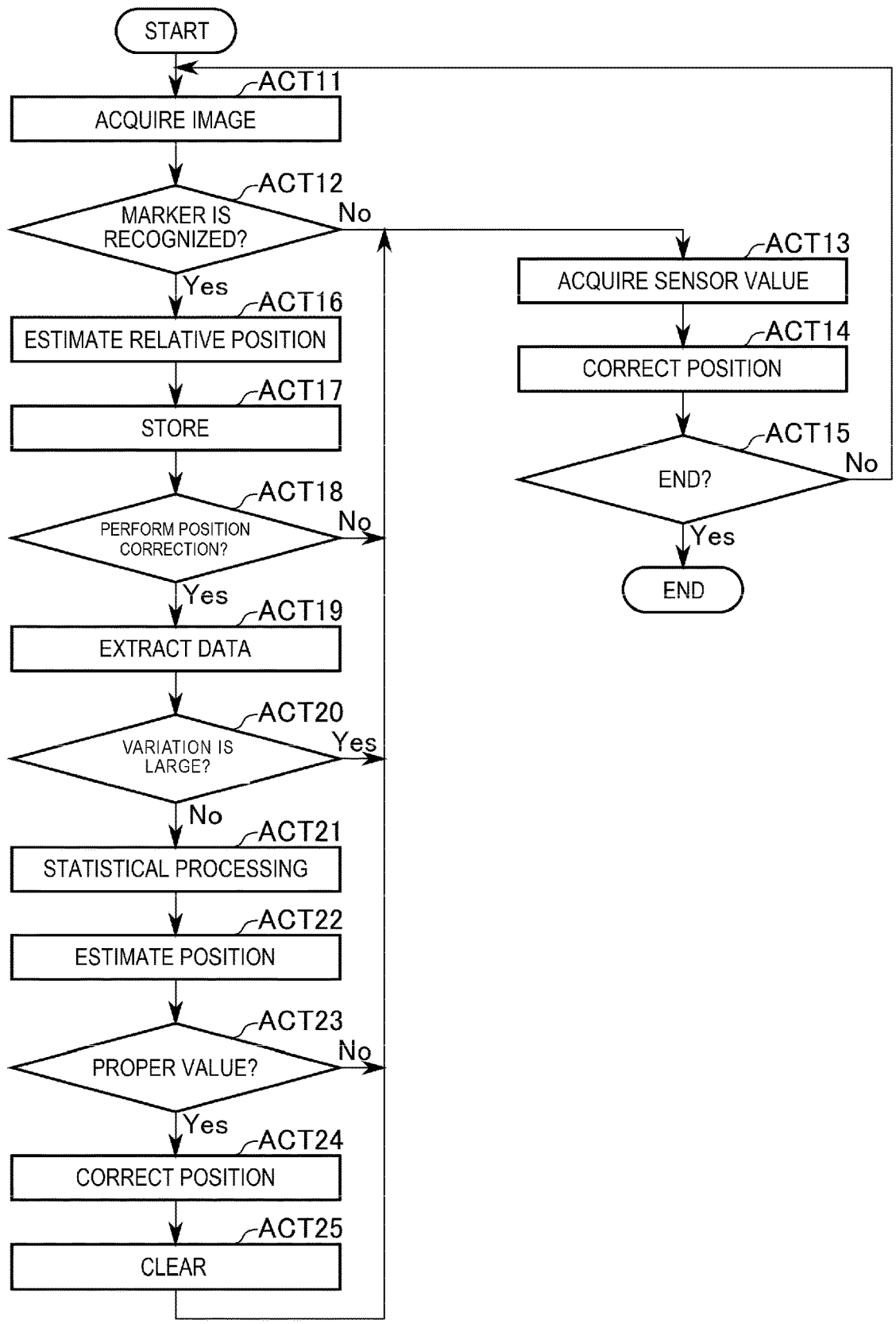
FIG. 2 is a flowchart of processing performed by a terminal device according to an embodiment.

The operation of the terminal device 10 according to an embodiment is explained below with reference to FIG. 2. the following operation is an example. In other examples, different processing capable of obtaining the same or substantially the same result can be substituted as appropriate. FIG. 2 is a flowchart of processing by the processor 11 of the terminal device 10. The processor 11 executes this processing according to, for example, a program(s) stored in the ROM 12, the auxiliary storage device 14, or the like.

The processor 11 starts the processing illustrated in FIG. 2 according to, for example, operation for turning on tracking.

In ACT 11 in FIG. 2, the processor 11 controls the camera 16 to acquire an image. The image acquired in ACT 11 is hereinafter referred to as "acquired image".

In ACT 12, the processor 11 determines whether a marker registered in the marker DB 141 is included in the acquired image. If the marker is recognized as being included in the acquired image, the processor 11 determines that the marker has been photographed. Any known method can be adopted for recognizing a marker in an image. The marker recognized in ACT 12 is referred to as "recognized marker". If the marker is not included in the acquired image, the processor 11 determines No in ACT 12 and proceeds to ACT 13.

The processor 11 thus performs the processing in ACT 12 and functions as a recognizing unit that recognizes the marker in the acquired image.

In ACT 13, the processor 11 acquires a measurement value output by the sensor 18.

In ACT 14, the processor 11 updates the position and the posture of the terminal device 10 based on the measurement value acquired in ACT 13. In other words, the processor 11 tracks the position and the posture of the terminal device 10 based on the measurement value acquired in ACT 13. For example, the processor 11 estimates a position and a posture using a method such as dead reckoning (DR). The processor 11 determines the estimated position and the estimated posture as a present position and a present posture of the terminal device 10 to update or adjust the position and the posture of the terminal device 10. The processor 11 sets the value of a variable T1 to the present time. The variable T1 thus indicates time when the present position and the present posture of the terminal device 10 was last determined. The position and the posture of the terminal device 10 can be, for example, the position and the posture of the camera 16 (or the touch panel 17) in the global coordinate system.

In ACT 15, the processor 11 determines whether to end the tracking. The processor 11 determines to end the tracking according to, for example, a user input operation instructing the turning off of the tracking. If the tracking is not ending or instructed to be ended, the processor 11 determines No in ACT 15 and returns to ACT 11. On the other hand, if the tracking is to be ended, the processor 11 determines Yes in ACT 15 and ends the processing illustrated in FIG. 2.

If the marker is in the acquired image, the processor 11 determines Yes in ACT 12 and proceeds to ACT 16.

In ACT 16, the processor 11 estimates a relative position and a relative posture of the recognized marker with respect to the terminal device 10. In this context, the position and the posture of the terminal device 10 may refer more particularly to, for example, the position and the posture of the camera 16 or the position and the posture of the touch panel 17. The position of the recognized marker is, for example, the position of a particular point of the recognized marker in the acquired image. The particular point is, for example, the center of the recognized marker in the image. The processor 11 estimates a distance between the terminal device 10 and the recognized marker, for example, using analysis of the acquired image. This distance may be referred to as a relative position of the marker. The processor 11 estimates from the acquired image, an angle between a direction in which the terminal device 10 faces and a direction in which a plane of the recognized marker faces. This angle may be referred to as a relative posture. Other known methods can also be used as the method of estimating a position and a posture of a device.

The processor 11 thus performs the processing in ACT 16 and functions as a relative-position estimating unit that estimates the relative positions of the camera 16 (in this example) and the marker.

In ACT 17, the processor 11 stores the relative position and the relative posture estimated in ACT 16 in association with a marker ID of the recognized marker and a recognition time (time of recognition) in the RAM 13 or the like as history data. The recognition time in this context is the time at which the marker was recognized in ACT 12.

In ACT 18, the processor 11 determines whether to perform position correction. For example, the processor 11 refers to the history data and determines whether a relative position and a relative posture of a marker having the same marker ID have been stored a predetermined number of times n1 or more within a predetermined time period t1. If the relative position and the relative posture of the marker having the same marker ID are stored n1 times or more within the predetermined time period t1, the processor 11 determines to perform the position correction. For example, t1 is five seconds and n1 is three times. In such a case, if a relative position and a relative posture of the same marker are estimated three times or more within five seconds, the processor 11 determines to perform the position correction. Consequently, while the camera 16 photographs the marker, the processor 11 performs the position correction every time the relative position and the relative posture are estimated three times. The time period t1 is any time period and n1 is an integer equal to or larger than 2. If not determining to perform the position correction, the processor 11 determines No in ACT 18 and proceeds to ACT 13. On the other hand, if determining to perform the position correction, the processor 11 determines Yes in ACT 18 and proceeds to ACT 19.

In ACT 19, the processor 11 extracts, from the history data, data having the same marker ID as the marker ID of the recognized marker.

An upper limit n2 may be set for the number of data to be extracted. For example, even if there are n2 or more history data having the same marker ID, the processor 11 extracts n2 data in order from data at the latest recognition time. However, if the number of history data having the same marker ID is smaller than n2, the processor 11 extracts all the data having the same marker ID as the marker ID of the recognized marker. The upper limit n2 may be any integer value equal to or larger than 2.

The processor 11 may extract only data, recognition time of which is between the present time and a predetermined time t2 before the present time. The predetermined time t2 may be any time. The processor 11 may extract data, recognition time of which is between the present time and the predetermined time t2, in order from data of the latest recognition time. The number of the data extracted is smaller than or equal to the upper limit n2.

In ACT 20, the processor 11 determines whether variation in a plurality of data extracted in ACT 19 is large. For example, the processor 11 determines that the variation is large if a standard deviation σ of the plurality of data is equal to or larger than a predetermined value. Alternatively, the processor 11 may determine that the variation is large using other known methods. If the variation in the plurality of data is large, the processor 11 determines Yes in ACT 20 and proceeds to ACT 13. On the other hand, if the variation in the plurality of data is not large, the processor 11 determines No in ACT 20 and proceeds to ACT 21.

In ACT 21, the processor 11 estimates a relative position and a relative posture of the recognized marker with respect to the terminal device 10 with a statistical method using the plurality of data extracted in ACT 19. For example, the processor 11 performs time-series smoothing on the plurality of data using a method such as moving average to estimate the relative position and the relative posture of the marker. The processor 11 may discard an outlier among the plurality of data. For example, the processor 11 sets, as the outlier, a value deviating from the median of the plurality of data by a predetermined value or more. Alternatively, the processor 11 may identify and discard an outlier using other known methods.

In ACT 22, the processor 11 estimates a position and a posture of the terminal device 10 based on the relative position and the relative posture estimated in ACT 21 and the position and the posture of the recognized marker. The processor 11 acquires the position and the posture of the recognized marker from the marker DB.

The processor 11 performs the processing in ACT 18 and ACT 22 and thus functions as a position estimating unit that estimates a position of the camera 16 (in this example) if the number of times the marker has been recognized is equal to or greater than a predetermined number of times. The processor 11 performs the processing in ACT 21 and ACT 22 and thus functions as a position estimating unit that estimates the position of the camera 16 (in this using a plurality of relative positions.

In ACT 23, the processor 11 determines whether the position and the posture estimated in ACT 22 are proper values. For example, the processor 11 determines that the position and the posture are not the proper values if the position and the posture has suddenly changed. A method of determining that the position and the posture are not the proper values because the position and the posture suddenly changed is explained below.

For example, the processor 11 determines that the position and the posture are not the proper values if the position and the posture estimated in ACT 22 are different from the present position and the present posture of the terminal device 10 determined in ACT 14 or ACT 24 by amounts larger than some predetermined values. For example, the processor 11 determines that the position and the posture are not the proper values if speed of the terminal device 10, which is obtained by dividing the distance from the present position of the terminal device 10 to the position estimated in ACT 22 by a time obtained by subtracting T1 from the present time, is equal to or higher than some predetermined speed. The predetermined speed is, for example, a speed markedly high with respect to normal human walking speed. Alternatively, the processor 11 determines that the position and the posture are not the proper values if the distance from the present position of the terminal device 10 to the position estimated in ACT 22 is equal to or larger than a predetermined distance. The processor 11 determines that the position and the posture are not the proper values, for example, if angular velocity, which is obtained by dividing the angle from the present posture of the terminal device 10 to the posture estimated in ACT 22 by the time obtained by subtracting T1 from the present time, is equal to or higher than some predetermined angular velocity. Alternatively, the processor 11 determines that the position and the posture are not the proper values if the angle from the present posture of the terminal device 10 to the posture estimated in ACT 22 is equal to or larger than a predetermined angle.

If the position and the posture estimated in ACT 22 are not the proper values, the processor 11 determines No in ACT 23 and proceeds to ACT 13. In other words, the processor 11 discards the position and the posture that have been estimated in ACT 22 and does not use the position and the posture for the processing in ACT 24. On the other hand, if the position and the posture estimated in ACT 22 are proper values, the processor 11 determines Yes in ACT 23 and proceeds to ACT 24.

In ACT 24, the processor 11 corrects or adjusts the position and the posture of the terminal 10 based on the position and the posture estimated in ACT 22. In other words, the processor 11 determines the position and the posture estimated in ACT 22 as the new present position and the new present posture of the terminal device 10 to update the position and the posture of the terminal device 10. The processor 11 sets value of the variable T1 to the present time.

In ACT 25, the processor 11 clears the history data. Consequently, no history data is stored in the RAM 13 and the like. After the processing in ACT 25, the processor 11 proceeds to ACT 13.

The terminal device 10 updates the position and the posture of the terminal device 10 if the same marker is recognized a predetermined number of times or more within a predetermined time period. Consequently, even in a state in which the measurement accuracy is deteriorated, the terminal device 10 can be highly accurate in updating/correcting the position and the posture of the terminal device 10.

The terminal device 10 measures a relative position and a relative posture of the marker a plurality of times and estimates the position and the posture of the terminal device 10 using the relative positions and the relative postures measured a plurality of times. Consequently, even in a state in which the measurement accuracy would be expected to be deteriorated, the terminal device 10 can be highly accurate in establishing/estimating the position and the posture of the terminal device 10.

The terminal device 10 measures a relative position and a relative posture of the marker a plurality of times and performs time-series smoothing on the relative positions and the relative postures measured the plurality of times to estimate the position and the posture of the terminal device 10. Consequently, even when the measurement accuracy is deteriorated, the terminal device 10 can accurately correct the position and the posture of the terminal device 10.

The terminal device 10 corrects the position and the posture of the terminal device 10 only when variation in the data obtained by measuring a relative position and a relative posture of the marker a plurality of times is less than some predetermined variation. Consequently, the terminal device 10 can prevent a correction that has a large error from being performed.

If the estimated position and the estimated posture of the terminal device 10 suddenly change from the present position and the present posture, the terminal device 10 discards the estimated values of the position and the posture. Consequently, the terminal device 10 can prevent a correction having a large error from being performed.

Modifications of aforementioned embodiments explained below are also possible.

If determining Yes in ACT 20, the processor 11 may clear the history data as in ACT 25. If determining No in ACT 23, the processor 11 may clear the history data as in ACT 25.

The processor 11 may not perform the processing in ACT 25.

In the embodiments explained above, the processor 11 estimates the relative position and the relative posture of the recognized marker with respect to the terminal device 10 with a statistical method. Instead, the processor 11 may estimate the position and the posture of the terminal device 10 with a statistical method.

A part or all of the processing may be performed by dedicated hardware such as a circuit.

The terminal device 10 executes programs that have been stored in the terminal device 10. Such programs may be installed in the terminal device 10 via a removable storage medium such as a disk medium or a semiconductor memory or the Internet or a LAN.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device, comprising:
a memory to store a known position of a marker;
a camera configured to acquire an image; and
a processor configured to:
determine whether the image includes the marker,
calculate a relative position of the marker with respect to the camera and store the calculated relative position in the memory if the image includes the marker,
after two or more relative positions are calculated for the marker and stored in the memory, calculate a variance of the two or more relative positions, and
when the variance is less than a predetermined value, determine a position of the camera using the known position of the marker and the two or more relative positions calculated for the marker and stored in the memory.

2. The information processing device according to claim 1, wherein
the processor is further configured to determine whether a total number of relative positions of the marker stored in the memory reaches a predetermined value that is greater than or equal to two.

3. The information processing device according to claim 1, wherein the processor is further configured to perform time-series smoothing on the two or more relative positions of the marker when determining the position of the camera.

4. The information processing device according to claim 1, wherein the processor is further configured to determine that the determined position of the camera is erroneous based on a comparison to a previously determined position of the camera.

5. The information processing device according to claim 1, further comprising:
a sensor, wherein
the processor is further configured to adjust the determined position of the camera using a value acquired by the sensor.

6. The information processing device according to claim 1, further comprising:
a sensor, wherein
the processor is further configured to, upon determining that the image does not include the marker, determine the position of the camera using a value acquired by the sensor.

7. The information processing device according to claim 1, wherein the position of the camera is determined using the two or more relative positions acquired within a particular time period.

8. The information processing device according to claim 1, wherein the processor is further configured to delete said two or more relative positions from the memory after determining the position of the camera.

9. The information processing device according to claim 1, further comprising:
a display, wherein
the processor is further configured to generate a screen to be displayed on the display and indicating the image acquired by the camera and including the marker.

10. A method performed by an information processing device, the method comprising:
acquiring an image using a camera;
determining whether the image includes a marker;
calculating a relative position of the marker with respect to the camera and storing the calculated relative position in a memory if the image includes the marker;

after two or more relative positions are calculated for the marker and stored in the memory, calculating a variance of the two or more relative positions; and when the variance is less than a predetermined value, determining a position of the camera using a known position of the marker stored in the memory and the two or more relative positions calculated for the marker and stored in the memory.

11. The method according to claim 10, further comprising:

determining whether a total number of relative positions of the marker stored in the memory reaches a predetermined value that is greater than or equal to two.

12. The method according to claim 10, wherein the determining of the position of the camera includes performing time-series smoothing on the two or more relative positions of the marker.

13. The method according to claim 10, further comprising:

determining that the determined position of the camera is erroneous based on a comparison to a previously determined position of the camera.

14. The method according to claim 10, further comprising:

adjusting the determined position of the camera using a value acquired by a sensor.

15. The method according to claim 10, further comprising:

upon determining that the image does not include the marker, determining the position of the camera using a value acquired by a sensor.

16. The method according to claim 10, wherein the position of the camera is determined using the two or more relative positions acquired within a predetermined period.

17. The method according to claim 10, further comprising:

deleting the two or more relative positions from the memory after the position of the camera has been determined.

18. A non-transitory computer readable medium storing a program causing a computer to execute a method comprising:

acquiring an image using a camera;

determining whether the image includes a marker;

calculating a relative position of the marker with respect to the camera and storing the calculated relative position in a memory if the image includes the marker;

after two or more relative positions are calculated for the marker and stored in the memory, calculating a variance of the two or more relative positions; and when the variance is less than a predetermined value, determining a position of the camera using a known position of the marker stored in the memory and the two or more relative positions calculated for the marker and stored in the memory.

\* \* \* \* \*